United States Patent [19]
Arndt et al.

[11] Patent Number: 4,623,092
[45] Date of Patent: Nov. 18, 1986

[54] HEATING AND COOLING SYSTEM FOR A MOTOR VEHICLE

[75] Inventors: Norbert Arndt, Rüsselsheim; Udo Schneider, Mörfelden-Walldorf, both of Fed. Rep. of Germany

[73] Assignee: General Motors Corporation, Detroit, Mich.

[21] Appl. No.: 658,426

[22] Filed: Oct. 5, 1984

[30] Foreign Application Priority Data

Oct. 26, 1983 [DE] Fed. Rep. of Germany ....... 3338769

[51] Int. Cl.$^4$ .............................................. B60H 1/02
[52] U.S. Cl. ........................... 237/12.3 C; 237/12.3 A
[58] Field of Search ...................... 237/12.3 C, 12.3 B, 237/12.3 R, 12.3 A

[56] References Cited

U.S. PATENT DOCUMENTS

| | | | |
|---|---|---|---|
| 2,076,382 | 4/1937 | Minton | 237/12.1 |
| 3,325,100 | 6/1967 | Fairbanks et al. | 237/12.3 C |
| 3,861,590 | 1/1975 | Kofink | 237/12.3 C |

FOREIGN PATENT DOCUMENTS

| | | | |
|---|---|---|---|
| 2231117 | 1/1974 | Fed. Rep. of Germany | 237/12.3 |
| 2705748 | 8/1978 | Fed. Rep. of Germany | 237/12.3 C |

*Primary Examiner*—Henry Bennett
*Attorney, Agent, or Firm*—R. L. Phillips

[57] ABSTRACT

A heating and cooling system is disclosed for a motor vehicle powered by a water-cooled internal combustion engine wherein the engine radiator is mounted inside a housing, and the air flowing into the occupant compartment is caused to pass through said radiator. When the engine is hot, the radiator transfers heat to the air stream flowing into the compartment. A heat exchanger is mounted upstream of the radiator and is adapted to heat the air before it passes through the radiator. By virtue of this arrangement, the heat exchanger assists in raising the temperature of the engine cooling water and thus the engine at a rapid pace. The arrangement also provides that warm air for heating the vehicle interior is available shortly after starting of the engine to prevent fogging of the windows prior to engine warm up.

4 Claims, 1 Drawing Figure

U.S. Patent  Nov. 18, 1986  4,623,092
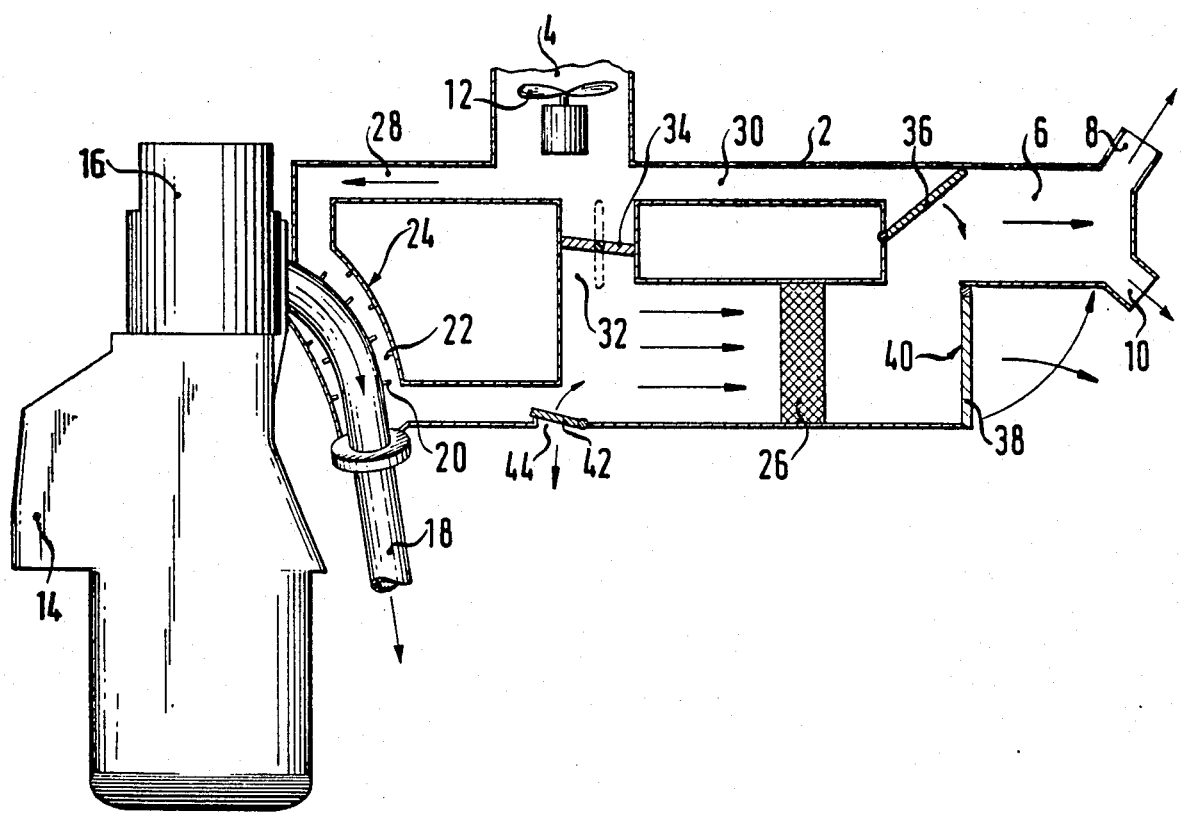

HEATING AND COOLING SYSTEM FOR A MOTOR VEHICLE

TECHNICAL FIELD

The invention relates to a heating and cooling system for motor vehicles equipped with a water-cooled internal combustion engine and a radiator through which the engine cooling water is flowing wherein the radiator is arranged inside a housing provided with an outside air admission means and at least one conduit extending to the car interior, and including a heating device arranged upstream of said radiator.

BACKGROUND OF THE INVENTION

A heating and cooling system of the above type is disclosed in the German publication No. DE-OS 22 31 117. In this type heating and cooling system, after the engine is hot the air for heating the car interior is heated as it flows through the engine radiator. The heating device, which is mounted ahead of the radiator, is operated by the same fuel that is used for running the engine and not only serves as an auxiliary heater in that it heats the occupant compartment while the engine is still cold, but also expedites the warm up of the engine after starting, because the air, after being heated by the engine, is first flowing through the engine radiator, whereby some of its heat is transferred to the engine cooling system.

While the heating and cooling system disclosed in the German publication No. DE-OS 22 13 117 is capable of rapidly warming up the engine and heating the car interior, it requires a relatively large amount of energy and thereby raises the fuel consumption of a vehicle equipped with such a system to an undesirable degree.

In the German publication No. DE-OS 27 05 748, another type of heating and cooling system is disclosed which incorporates an exhaust gas heat exchanger for warming up the water of the engine cooling system. The system for heating the car interior includes a heat exchanger which is mounted in parallel with the engine radiator and which is adapted to raise the temperature of the air used for heating the occupant compartment. However, as long as the engine is still cold, the water of the engine cooling system is directed, by means of a thermostatic valve, exclusively through the engine radiator, so that the engine will warm up to its operating temperature in a relatively short period of time. With the vehicle being still at rest or moving very slowly, the radiator is relatively ineffective during this warm up period. As a result, the heating system for the occupant compartment is supplied with little heat during this engine warm up period tending to cause fogging of the windows at low ambient temperature. While an exhaust gas heat exchanger of this type is useful for shortening this operating phase in comparison to ordinary heating systems, the engine warm up period is still relatively long under low temperature weather conditions.

SUMMARY OF THE INVENTION

It is the primary object of the present invention to provide a heating and cooling system of the type described above which, even though it does not incorporate an auxiliary heating unit, is capable of warming up the engine as well as heating the occupant compartment within a relatively short period of time after engine starting.

This objective is achieved by the invention in the form of an exhaust gas heat exchanger for the heating system. Due to the fact that in an internal combustion engine the exhaust system will become hot immediately after engine starting on account of the hot exhaust gases, the exhaust gas heater is able to heat the air flowing through the engine radiator within a very short period of time, so that heated air can be rapidly forwarded into the occupant compartment. Prior to that the same air is warming up the water circulating in the cooling system by transferring some of its heat thereto, which will assist the engine in reaching its operating temperature very rapidly.

In contrast to ordinary heating and cooling systems, the heating and cooling system of the present invention does not require any additional energy for its operation since it uses only the heat supplied by the engine exhaust system. But unlike the heating and cooling system disclosed in the above German publication No. DE-OS 27 05 748, the subject heating and cooling system provides rapid heating of the car interior and thereby prevents unwanted initial fogging of the windows. It should also be noted that the cost of an exhaust gas heat exchanger is much lower than that of an auxiliary heating unit with its own burner, so that the heating and cooling system according to the invention will be less costly than one in which an auxiliary heating unit is used. Another beneficial factor is the low weight of the subject heating and cooling system, which will also contribute to a lower fuel consumption of the vehicle.

Among the features of the present invention, the heat output of the occupant compartment heater can be adjusted very easily, without the need for varying the volume of air passing through the radiator, a procedure that would affect the engine cooling process.

Outside air used for the fresh air supply can be fed, as is usual with ordinary vehicle heating systems, directly into the vehicle occupant compartment when, in accordance with a feature of the invention, there is provided downstream of the air intake a first bypass connection to the heater pipe in which air bypasses the engine radiator and the exhaust gas heat exchanger.

In the heating and cooling system according to the present invention, the arrangement is such that when the engine is hot, the cooling output of the engine radiator would be insufficient if only the preheated air coming from the exhaust heater were to be forwarded to the radiator. This problem is resolved in a relatively simple manner in that downstream of the air intake there is provided a second bypass connection which is extending to the engine radiator.

Then to increase the life of the exhaust pipe, the conduit for the air flowing through the exhaust heat exchanger is adapted to always be open in the direction towards the air intake by being provided downstream of the heat exchanger with an air outlet that is controlled by a door. This arrangement provides for the exhaust pipe, especially in the area of the cylinder head which is obviously the hottest portion, being cooled by a stream of fresh air even when the heating and cooling system does not need to be supplied with heat from the exhaust system.

BRIEF DESCRIPTION OF DRAWING

The accompanying FIGURE shows the preferred embodiment of the invention.

DESCRIPTION OF THE DRAWING

For a better understanding of the invention, reference is made to the accompanying drawing in which the subject heating and cooling system as installed in a motor vehicle is schematically illustrated in a sole FIGURE. In the drawing, the air flow control doors employed in the heating and cooling system are illustrated in a position the doors would assume when the engine is cold, the ambient air is cold and the heating system is turned on.

The heating system according to the invention is accommodated in the motor vehicle in a housing 2 which includes an air intake 4 and a heater duct 6 provided with air outlets 8, 10. A blower 12 is mounted downstream of the air intake 4 and is adapted to feed air from the air intake 4 through the housing 2 to the air outlets 8, 10. The blower may be of the type that is thermostatically controlled. At the left side of the drawing there is illustrated an engine block 14 of a water-cooled internal combustion engine powering the motor vehicle. This cylinder block 14 has a cylinder head 16 from which an exhaust pipe 18 branches off. This exhaust pipe 18 extends through the housing 2 of the heating and cooling system and, by the provision of fins 20, 22 on the exhaust pipe 18 and in the housing 2, respectively, serves as an exhaust gas heat exchanger inside the housing.

One other characteristic feature of the invention is that the radiator 26 necessary for cooling the engine is mounted inside the housing 2. In the operating phase of the heating and cooling system illustrated in the drawing, a flow path 28 is established along the exhaust gas heat exchanger 24 through the engine radiator 26 to the heat pipe 6 and from there to the air outlets 8 and 10 which serve as a means for distributing the air to the occupant compartment in the vehicle. In order to provide that, if desired, only unheated fresh air is directed into the car interior by a first bypass connection 30 arranged inside the housing 2 by which the air, instead of traveling through the exhaust gas heater 24 and the engine radiator 26, is routed from the air intake 4 directly to the heater duct 6. A second bypass connection 32 is provided and is arranged such that the air is directed through the engine radiator 26 but bypasses the exhaust gas heat exchanger 24.

A plurality of doors are provided for controlling and adjusting the heating and cooling system. Inside the second bypass connection 32 is mounted a thermostatically controlled door 34 which, in the position illustrated in the drawing, is closing off the second bypass connection 32. The first bypass connection 30 is also closed off, which is done by the door 36. A door 38 is arranged downstream of the engine radiator 26 which, when in the position illustrated in the drawing, is closing off an air outlet 40 leading to outside of the vehicle. A corresponding door 42 is arranged in the flow connection 28 for closing off, as illustrated in the drawing, an air outlet 44 which is also leading to outside of the vehicle. The doors 34 and 44 are coupled with one another and are thermostatically controlled. The coupling and control arrangement is such that the doors 34 and 44 are always opening and closing simultaneously, and are either both completely closed or completely opened.

The operation of the heating and cooling system is as follows. At low ambient temperatures, prior to engine warm up, and when the heater is called upon to furnish heat, outside air is flowing into the air intake 4 and travels by way of the flow path 28 to the exhaust gas heat exchanger 24. From there, the air flows through the engine radiator 26 and then travels upwardly again to the heater duct 6. The doors 34 and 36 are then blocking the two bypass connections. Furthermore, the air cannot escape to the outside, because the doors 42 and 38 are in their closed position. Due to the fact that the exhaust pipe 18 is heating up rapidly after the engine has been started up, the air flowing through the heat exchanger 24 is also warming up rapidly and is able to transfer some of that heat to the engine radiator 26 and the car interior.

When the engine has come up to its operating temperature, the door 34 and 42 will be caused to open up, so that the air is able to travel from the air intake 4 through the second bypass connection 32 to the radiator 26 and from there to the heater duct 6. During this operating phase, some of the air is still flowing through the flow connection 28 and the exhaust gas heat exchanger 24, but instead of flowing through the radiator 26, the air will exit from the housing through opening 44.

If the engine temperature continues to rise, the door 38 will also open up. This will cause the air resistance of the heating and cooling system to be lowered, so that a greater volume of air is able to flow through the radiator 26, which will intensify the cooling process.

If no heat is wanted in the occupant compartment, one need only move the door 36 into its second end position (not shown). This will cause the door 38 to open, so that all the air flowing through the engine radiator 26 is permitted to escape to the outside through the opening 40.

When the initial condition is one in which the engine is cold, the ambient air is warm and the heater is off, the door 36 will again be in the second end position (not shown). In this instance, only fresh outside air, which will flow from the air intake 4 along the first bypass connection 30 and through the heater duct 6 will be directed into the vehicle interior. The doors 36 and 38 are coupled in such a manner that the door 38 is initially slightly open. The doors 34 and 44 remain closed.

Outside air will also flow from the air intake 4 through the flow connection 28 to the heat exchanger 24, and will travel from there to the radiator 26 and finally to the outside through opening 40. Because of the heat given off by the exhaust gases, this air stream will warm up rapidly and, in passing through the radiator, the temperature of the engine cooling system will also rise rapidly. Once the engine has come up to its operating temperature, the door 34 and 42 will move into open position, so that the exhaust gas heat exchanger will no longer be able to contribute to the temperature rise of the heating system. If the temperature in the engine cooling system should continue to rise, the door 38 will open further and will, by means of thermostatic controls, regulate the engine cooling system.

The above described preferred embodiment is illustrative of the invention which may be modified within the scope of the appended claims.

The embodiments of the invention in which an exclusive property or privilege is claimed are defined as follows:

1. Heating and cooling system for a motor vehicle equipped with a water-cooled internal combustion engine, including an exhaust pipe through which exhaust gases exit from the engine, an engine radiator through which water for cooling the engine is circulating, said engine radiator being mounted inside a housing provided with an air intake for admitting outside air and with at least one heater duct extending to the vehicle interior, and wherein a heater is mounted upstream of the engine radiator, the improvement comprising:

the heater being in the form of an exhaust gas heat exchanger served by the exhaust pipe, and control means provided inside the housing and downstream of the engine radiator for selectively redirecting the air stream flowing through the engine radiator to outside the vehicle through an opening or to the heater duct, and a first bypass connection arranged behind the air intake extending to the heater duct for causing the air to bypass the exhaust gas heat exchanger and the engine radiator.

2. Heating and cooling system for a motor vehicle equipped with a water-cooled internal combustion engine, including an exhaust pipe through which exhaust gases exit from the engine, an engine radiator through which water for cooling the engine is circulating, said engine radiator being mounted inside a housing provided with an air intake for admitting outside air and with at least one heater duct extending to the vehicle interior, and wherein a heater is mounted upstream of the engine radiator, the improvement comprising:

the heater being in the form of an exhaust gas heat exchanger served by the exhaust pipe, and control means provided inside the housing and downstream of the engine radiator for selectively redirecting the air stream flowing through the engine radiator to outside the vehicle through an opening or to the heater duct, a first bypass connection arranged behind the air intake extending to the heater duct for causing the air to bypass the exhaust gas heat exchanger and the engine radiator, and a second bypass connection arranged behind the air intake extending to the engine radiator for causing the air to bypass the exhaust gas heat exchanger.

3. Heating and cooling system for a motor vehicle equipped with a water-cooled internal combustion engine, including an exhaust pipe through which exhaust gases exit from the engine, an engine radiator through which water for cooling the engine is circulating, said engine radiator being mounted inside a housing provided with an air intake for admitting outside air and with at least one heater duct extending to the vehicle interior, and wherein a heater is mounted upstream of the engine radiator, the improvement comprising:

the heater being in the form of an exhaust gas heat exchanger served by the exhaust pipe, and control means provided inside the housing and downstream of the engine radiator for selectively redirecting the air stream flowing through the engine radiator to outside the vehicle through an opening or to the heater duct, and a flow connection extending past the exhaust gas heat exchanger that is permanently open in the direction of the air intake and is provided downstream of the exhaust gas heat exchanger with an opening which is controlled by a door.

4. Heating and cooling system for a motor vehicle equipped with a water-cooled internal combustion engine, including an exhaust pipe through which exhaust gases exit from the engine, an engine radiator through which water for cooling the engine is circulating, said engine radiator being mounted inside a housing provided with an air intake for admitting outside air and with at least one heater duct extending to the vehicle interior, and wherein a heater is mounted upstream of the engine radiator, the improvement comprising:

the heater being in the form of an exhaust gas heat exchanger served by the exhaust pipe, and control means provided inside the housing and downstream of the engine radiator for selectively redirecting the air stream flowing through the engine radiator to outside the vehicle through an opening or to the heater duct, a first bypass connection arranged behind the air intake extending to the heater duct for causing the air to bypass the exhaust gas heat exchanger and the engine radiator, and a door mounted inside the second bypass connection in which the air bypasses the exhaust gas heat exchanger, and a door mounted downstream of the exhaust gas heat exchanger, wherein the doors are coupled with one another and thermostatically controlled in such a manner that when a predetermined temperature is exceeded, the doors will be caused to move in synchronism from a closed position to an open position.

* * * * *